United States Patent
Nishikawa et al.

(10) Patent No.: US 12,496,932 B2
(45) Date of Patent: Dec. 16, 2025

(54) INFORMATION PROCESSING METHOD AND INFORMATION PROCESSING SYSTEM

(71) Applicant: PANASONIC INTELLECTUAL PROPERTY MANAGEMENT CO., LTD., Osaka (JP)

(72) Inventors: Shinya Nishikawa, Osaka (JP); Changhui Yang, Osaka (JP); Takashi Iida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 504 days.

(21) Appl. No.: 18/003,837

(22) PCT Filed: Jun. 28, 2021

(86) PCT No.: PCT/JP2021/024336
§ 371 (c)(1),
(2) Date: Dec. 29, 2022

(87) PCT Pub. No.: WO2022/014311
PCT Pub. Date: Jan. 20, 2022

(65) Prior Publication Data
US 2024/0025295 A1    Jan. 25, 2024

(30) Foreign Application Priority Data
Jul. 14, 2020    (JP) .................................. 2020-120550

(51) Int. Cl.
*B60L 58/16*    (2019.01)
*G01R 31/392*    (2019.01)

(52) U.S. Cl.
CPC ............ *B60L 58/16* (2019.02); *G01R 31/392* (2019.01)

(58) Field of Classification Search
CPC ...... B60L 58/16; B60L 2250/16; B60L 58/10; B60L 50/60; B60L 58/12; G01R 31/392;
(Continued)

(56) References Cited

U.S. PATENT DOCUMENTS

| | | | |
|---|---|---|---|
| 8,981,782 B2 * | 3/2015 | Henkel | G01R 19/16542 324/427 |
| 2003/0222622 A1 * | 12/2003 | Franke | H02J 7/0069 320/135 |
| 2022/0308120 A1 * | 9/2022 | Izumi | G01R 31/392 |

FOREIGN PATENT DOCUMENTS

| | | | |
|---|---|---|---|
| JP | 2018-054488 A | 4/2018 | |
| WO | WO 2007030816 A2 * | 3/2007 | ............ H01M 4/136 |

OTHER PUBLICATIONS

International Search Report dated Aug. 17, 2021 issued in International Patent Application No. PCT/JP2021/024336, with English translation.

\* cited by examiner

*Primary Examiner* — Tung S Lau
(74) *Attorney, Agent, or Firm* — Rimon P.C.

(57) ABSTRACT

An information processing device acquires power consumption information indicating information corresponding to a power consumption amount per use unit of an electric apparatus driven by a battery; acquires initial capacity information indicating an initial capacity of the battery; calculates a first end of life of the battery on the basis of the power consumption information and the initial capacity information; acquires a second end of life of the battery set according to characteristics of the battery; and outputs a shorter one of the first end of life and the second end of life as a third end of life of the battery.

7 Claims, 8 Drawing Sheets

(58) Field of Classification Search
CPC ........ Y02E 60/10; Y02T 10/70; H01M 10/42; H01M 10/48; H02J 7/00
See application file for complete search history.

INFORMATION PROCESSING METHOD AND INFORMATION PROCESSING SYSTEM

CROSS REFERENCE TO RELATED APPLICATIONS

This application is the U.S. National Phase under 35 U.S.C. § 371 of International Patent Application No. PCT/JP2021/024336, filed on Jun. 28, 2021 which in turn claims the benefit of Japanese Patent Application No. 2020-120550, filed on Jul. 14, 2020, the entire disclosures of which applications are incorporated by reference herein.

TECHNICAL FIELD

The present disclosure relates to an information processing method and an information processing system.

BACKGROUND ART

Patent Literature 1 below discloses a technique for calculating information regarding an end of life of a battery (e.g., a battery capacity or replacement timing) on the basis of a detection result of a state of the battery.

In the technique disclosed in Patent Literature 1, information on an end of life of a battery is uniformly calculated on the basis of a state of the battery.

CITATION LIST

Patent Literature

Patent Literature 1: JP 2018-54488 A

SUMMARY OF INVENTION

An object of the present disclosure is to provide a technique enabling calculation of an end of life of a battery for driving an electric apparatus according to a use mode of the electric apparatus while ensuring safety.

An information processing method according to an aspect of the present disclosure includes, by an information processing device: acquiring power consumption information indicating information corresponding to a power consumption amount per use unit of an electric apparatus driven by a battery; acquiring initial capacity information indicating an initial capacity of the battery; calculating a first end of life of the battery on the basis of the power consumption information and the initial capacity information; acquiring a second end of life of the battery set according to characteristics of the battery; and outputting a shorter one of the first end of life and the second end of life as a third end of life of the battery.

DESCRIPTION OF EMBODIMENTS

Knowledge Underlying Present Disclosure

Figure 1:
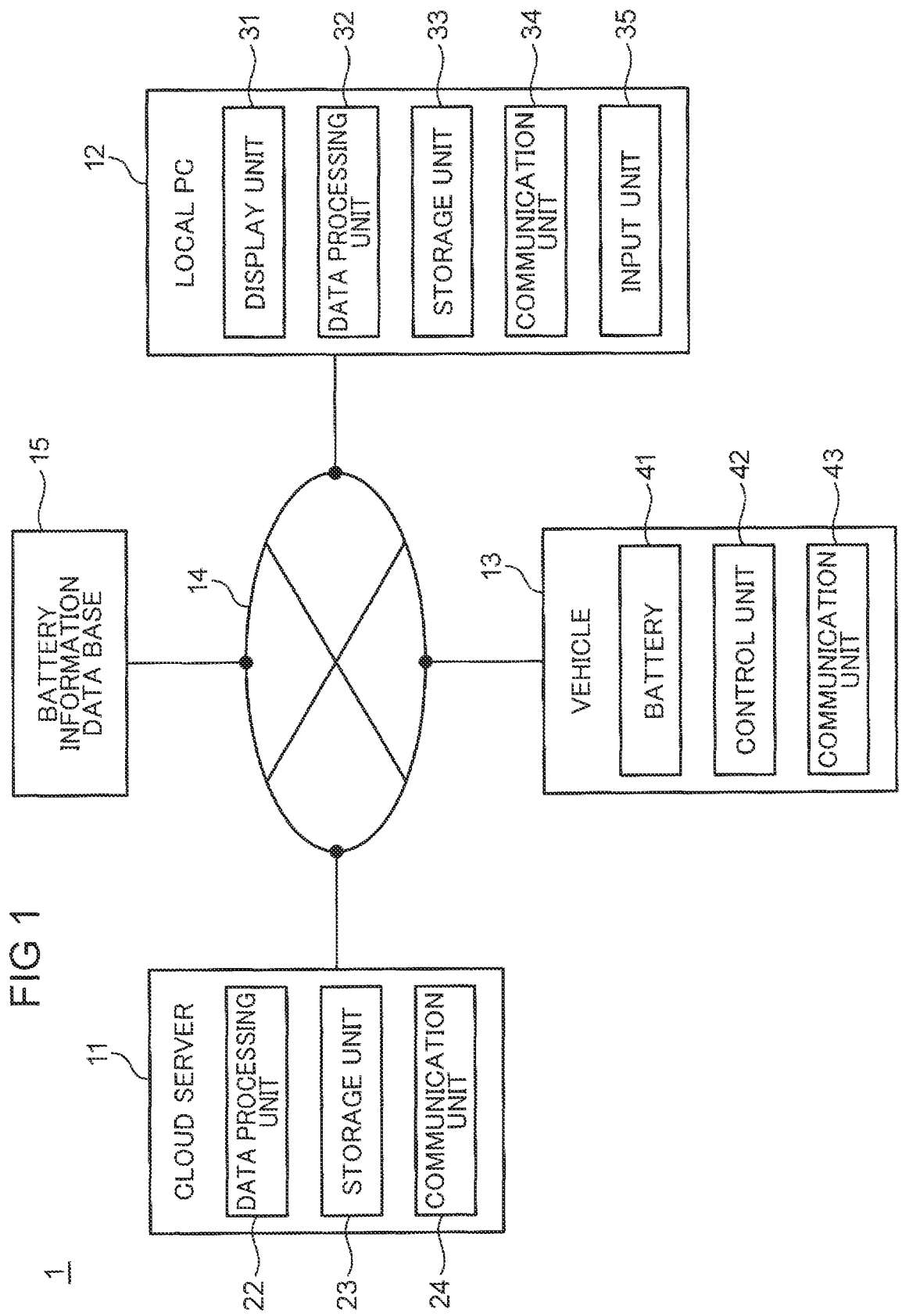
FIG. 1 is a block diagram illustrating a configuration of an information processing system according to a first embodiment of the present disclosure.

A product purchased through mail order using the Internet or the like is delivered to a home or the like of a customer by a home delivery agent. The home delivery agent uses a plurality of trucks to deliver a parcel in a delivery area in charge. In the future, an electric vehicle (EV) on which a battery-driven traveling motor is mounted will become widespread, and home delivery agents that deliver parcels by EV trucks is expected to increase in number.

In an EV, a battery deteriorates according to a total travel distance from the time of new car. A state of health (SoH) is generally used as an index indicating a deterioration degree of a battery. When the SoH decreases to an allowable lower limit value in comparison with an initial value at the time of new car, this EV (or battery) is considered to come to the end of its life, and replacement with a new EV (or battery) is recommended. Usually, an allowable lower limit value is uniformly set by a battery manufacturer, a car manufacturer, or the like, and is set to, for example, "80%".

However, a use mode varies depending on an EV, and there is a case where no problem occurs in practical use even if the EV is continuously used after an SoH of the battery decreases to less than a uniform allowable lower limit value. For example, for an EV whose main use is short-distance driving and whose battery is frequently charged, there is no problem in practical use even if an SoH decreases to less than an allowable lower limit value because a power consumption amount per charge is small and the SoH required in the use mode is small. Not by replacing an EV every time an SoH decreases to a uniform allowable lower limit value, but by continuously using the EV even after the SoH decreases to less than the allowable lower limit value, a replacement cycle of the EV is made longer. As a result, a total cost of ownership (TCO) in a long term (e.g., ten years) can be reduced. On the other hand, from a viewpoint of ensuring safety, it is not preferable to allow continuous use of a battery even after exceeding a limit value set according to battery characteristics such as safety. Therefore, in order to achieve both reduction of TCO and ensuring of safety, it is important to individually determine an end of life of a battery according to a use mode of an EV while taking characteristics of the battery such as safety into consideration.

An encoder device disclosed in Patent Literature 1 includes: a position detection unit that detects position information of a movement part; a battery that supplies electric power to the position detection unit; a battery detection unit that detects a state of the battery; and a calculator that calculates lifetime information of the battery on the basis of a detection result obtained by the battery detection unit. The lifetime information of the battery includes at least one of time to reach a discharge end voltage of the battery, a remaining amount of the battery, time during which the position detection unit can operate by electric power supplied from the battery, and a period when the electric power supplied from the battery is insufficient for power consumption of the position detection unit.

However, the above Patent Literature 1 does not disclose that an end of life of a battery is individually determined according to a use mode of an electric apparatus while considering characteristics of the battery such as safety.

In order to solve the above problem, the present inventor has acquired knowledge that both reduction in TCO and ensuring of safety can be achieved by calculating a first end of life of a battery according to a use mode of an electric apparatus, acquiring a second end of life of the battery according to characteristics of the battery such as safety, and deriving an end of life of the battery on the basis of these pieces of information, and has arrived at the present disclosure.

Next, each aspect of the present disclosure will be described.

An information processing method according to an aspect of the present disclosure includes, by an information processing device: acquiring power consumption information indicating information corresponding to a power consumption amount per use unit of an electric apparatus driven by a battery; acquiring initial capacity information indicating an initial capacity of the battery; calculating a first end of life of the battery on the basis of the power consumption information and the initial capacity information; acquiring a second end of life of the battery set according to characteristics of the battery; and outputting a shorter one of the first end of life and the second end of life as a third end of life of the battery.

According to this configuration, the information processing device calculates the first end of life on the basis of the power consumption amount per use unit of the electric apparatus and the initial capacity of the battery, acquires the second end of life set according to the characteristics of the battery such as safety, and outputs the shorter one of the first end of life and the second end of life as the end of life (the third end of life) of the battery. Therefore, an end of life of a battery can be derived according to a use mode of an electric apparatus while ensuring safety. As a result, it is possible to achieve both reduction in a total cost and ensuring of safety.

In the above aspect, the electric apparatus is a movable body including a motor driven by the battery, and the method includes, by the information processing device: acquiring movement information of the movable body as the power consumption information, and calculating the power consumption amount on the basis of moving distance information per the use unit of the movable body included in the movement information.

According to this configuration, it is possible to appropriately manage an end of life of an EV or a battery mounted on the EV on the basis of movement information of the EV as a movable body.

In the above aspect, the method includes, by the information processing device: acquiring deterioration information indicating a deterioration degree of the battery; calculating a remaining lifetime of the battery on the basis of the third end of life and the deterioration degree; and outputting the remaining lifetime.

According to this configuration, it is possible to derive a remaining lifetime of a battery mounted on a movable body according to a use mode of the movable body while ensuring safety.

In the above aspect, the method includes calculating, by the information processing device, the remaining lifetime on the basis of a difference between a deterioration degree corresponding to the third end of life and the deterioration degree indicated by the deterioration information.

According to this configuration, it is possible to calculate a remaining lifetime from the comparison in terms of a deterioration degree.

In the above aspect, the method includes causing, by the information processing device, a presentation device to present the third end of life or the remaining lifetime.

According to this configuration, by causing the presentation device to present the third end of life or the remaining lifetime, it is possible to enable a user to grasp an end of life of a battery for each use mode. In particular, in a case of presenting a remaining lifetime, it is possible to provide a user with information that is easy for the user to intuitively understand.

In the above aspect, the method includes acquiring, by the information processing device, movement history information or movement plan information of the movable body as the movement information.

According to this configuration, the movement information as the power consumption information can be acquired by using the movement plan information itself or by estimating future movement plan information from past movement history information.

An information processing system according to an aspect of the present disclosure includes: a first acquisition unit that acquires power consumption information indicating information corresponding to a power consumption amount per use unit of an electric apparatus driven by a battery; a second acquisition unit that acquires initial capacity information indicating an initial capacity of the battery; a calculator that calculates a first end of life of the battery on the basis of the power consumption information and the initial capacity information; a third acquisition unit that acquires a second end of life of the battery set according to characteristics of the battery; and an output unit that outputs a shorter one of the first end of life and the second end of life as a third end of life of the battery.

According to this configuration, the calculator calculates the first end of life on the basis of the power consumption amount per use unit of the electric apparatus and the initial capacity of the battery, the third acquisition unit acquires the second end of life set according to the characteristics of the battery such as safety, and the output unit outputs a shorter one of the first end of life and the second end of life as the end of life (the third end of life) of the battery. Therefore, an end of life of a battery can be derived according to a use mode of an electric apparatus while ensuring safety. As a result, it is possible to achieve both reduction in a total cost and ensuring of safety.

The comprehensive or specific aspects of the present disclosure described above can be implemented as a system, a device, a method, an integrated circuit, a computer program, or any combination thereof. It is needless to say that such a computer program can be distributed using a computer-readable non-volatile recording medium such as a CD-ROM, or via a communication network such as the Internet.

Each of embodiments to be described below illustrates a specific example of the present disclosure. Numerical values, shapes, components, steps, order of steps, and the like shown in the following embodiments are merely examples, and are not intended to limit the present disclosure. Among components in the following embodiments, a component that is not described in an independent claim indicating the most significant concept will be described as an arbitrary component. All the embodiments have respective contents that can be combined.

In the following, embodiments of the present disclosure will be described in detail with reference to the drawings. Note that elements denoted by the same reference numerals in different drawings represent the same or corresponding elements.

First Embodiment

FIG. 1 is a block diagram illustrating a configuration of an information processing system 1 according to a first embodiment of the present disclosure. In an example of the present embodiment, the information processing system 1 is constructed as a management system of a home delivery agent that delivers a parcel to a customer's home or the like by an electric vehicle (EV). As an example, the home delivery agent owns a plurality of business establishments each in charge of each delivery area and a head office that controls the plurality of business establishments. A local PC12 is installed in the head office and each business establishment, and is connected to a cloud server 11. In addition, a plurality of vehicles 13 for parcel delivery is arranged in each business establishment. The cloud server 11, the local PC12, and the vehicle 13 are communicable with each other via an arbitrary communication network 14 such as an IP network. In addition, a battery information database 15 is connected to the communication network 14. The battery information database 15 stores battery information indicating specifications of a battery 41 provided from a battery manufacturer, an analysis manufacturer, or the like. The specifications include at least an initial capacity FCC_init and a second end of life EoL_b to be described later. The cloud server 11 can access the battery information database 15 via the communication network 14. Although in the present embodiment, the movable body is a vehicle, the present disclosure is not limited thereto. For example, the movable body may be an aircraft such as a drone, a ship, or a mobile robot.

The cloud server 11 includes a data processing unit 22, a storage unit 23, and a communication unit 24. The local PC includes a display unit 31, a data processing unit 32, a storage unit 33, a communication unit 34, and an input unit 35. The display unit 31 is a liquid crystal display, an organic EL display, or the like. The data processing units 22 and 32 are processors such as CPUs. The storage units 23 and 33 are HDDs, SSDs, or the like. The communication units 24 and 34 are communication modules that perform data communication according to a predetermined communication standard such as IP. The input unit 35 is a mouse, a keyboard, or the like.

The vehicle 13 is an EV truck or the like, and includes a battery 41, a control unit 42, and a communication unit 43. The battery 41 is a secondary battery such as a lithium ion battery for driving a traveling motor mounted on the vehicle 13. The control unit 42 is a battery management system (BMS) for performing operation control and state management of the battery 41. The communication unit 43 is a communication module that performs data communication according to a predetermined communication standard such as IP.

Note that an application target of the information processing system 1 according to the present embodiment is not limited to home delivery business, and is any business such as taxi business, car rental business, car sharing business, or chauffeur service that conducts business using a plurality of EVs.

Figure 2:
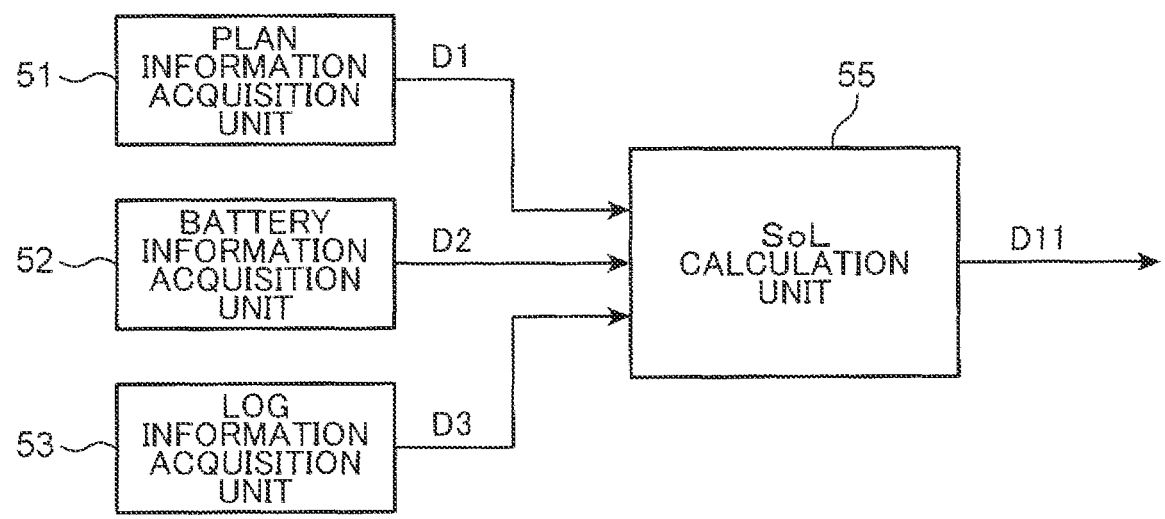
FIG. 2 is a block diagram illustrating functions of a data processing unit.

FIG. 2 is a block diagram illustrating functions of the data processing unit 22 of the cloud server 11. As illustrated in FIG. 2, the data processing unit 22 has a plan information acquisition unit 51, a battery information acquisition unit 52, a log information acquisition unit 53, and an SoL calculation unit 55. These functions may be realized in a software manner by execution, by a CPU, of a program read from a ROM or the like.

Figure 3:
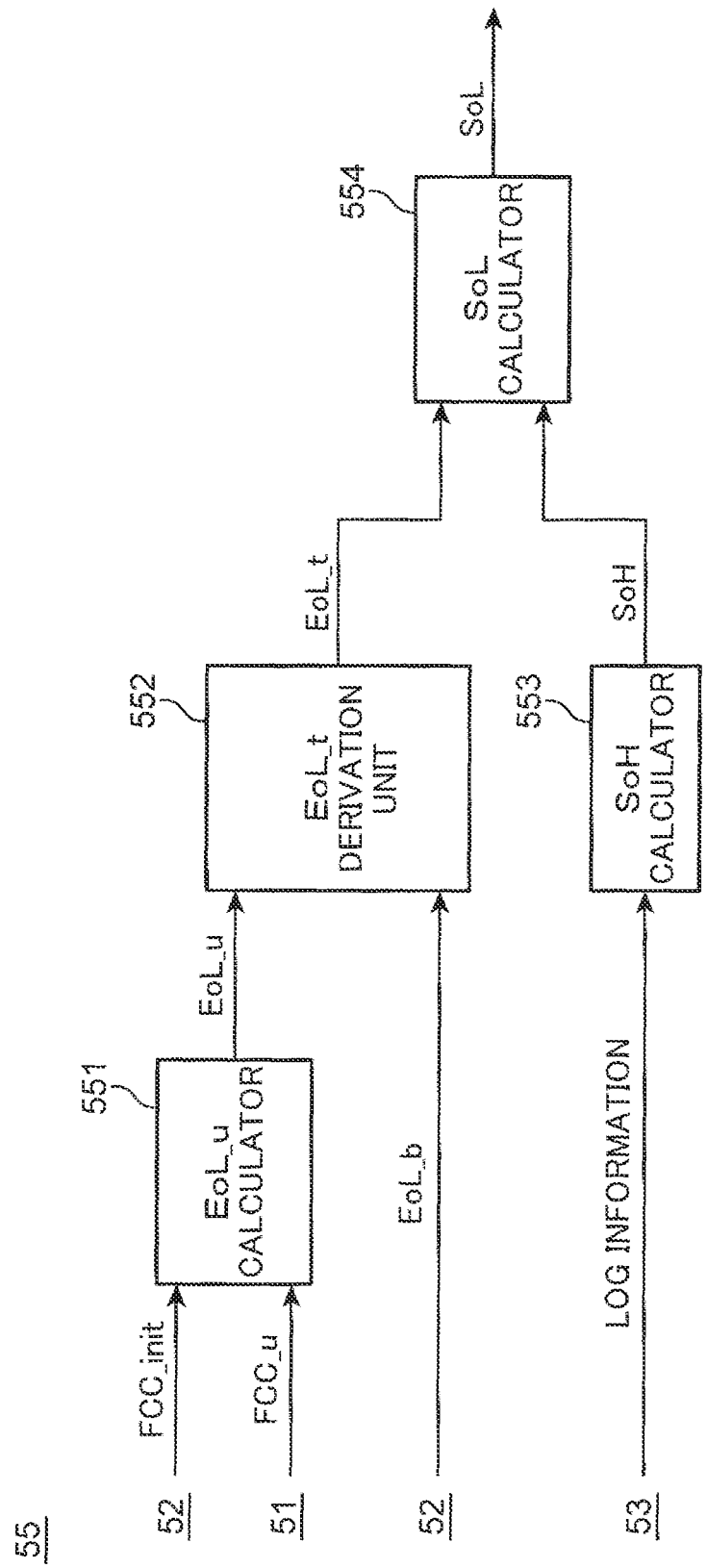
FIG. 3 is a block diagram illustrating a configuration of an SoL calculation unit.

FIG. 3 is a block diagram illustrating a configuration of the SoL calculation unit 55. As illustrated in a connection relationship of FIG. 3, the SoL calculation unit 55 includes an EoL_u calculator 551, an EoL_t derivation unit 552, an SoH calculator 553, and an SoL calculator 554.

The EoL_u calculator 551 calculates a first end of life EoL_u of the battery 41 on the basis of the initial capacity FCC_init input from the battery information acquisition unit 52 and a required capacity FCC_u input from the plan information acquisition unit 51. The initial capacity FCC_init is a capacity of the battery 41 when it is new, and is catalog information provided from a manufacturer of the battery 41 or the like. The required capacity FCC_u is power consumption information indicating a power consumption amount per use unit (per one charge) of each vehicle 13 obtained according to a use mode of each vehicle 13. The first end of life EoL_u is an end of life (End of Life) obtained according to the use mode of each vehicle 13. The EoL_u calculator 551 performs the following arithmetic calculation of:

$$EoL\_u = (FCC\_u / FCC\_init) \times 100 \quad (1),$$

thereby calculating the first end of life EoL_u.

The EoL_t derivation unit 552 derives a third end of life EoL_t, which is the end of life of the battery 41, on the basis of the first end of life EoL_u input from the EoL_u calculator 551 and the second end of life EoL_b input from the battery information acquisition unit 52. The second end of life EoL_b is a limit value set by a manufacturer of the battery 41, an analysis manufacturer, or the like according to battery characteristics such as safety. The EoL_t derivation unit 552 performs the following arithmetic calculation of:

$$EoL\_t = \max(EoL\_u, EoL\_b) \quad (2),$$

thereby deriving a larger value (i.e., a shorter lifetime) of the first end of life EoL_u and the second end of life EoL_b as the third end of life EoL_t.

The SoH calculator 553 calculates a deterioration degree SoH of the battery 41 on the basis of history information of charge/discharge of the battery 41 in log information input from the log information acquisition unit 53.

The SoL calculator 554 calculates a remaining lifetime SoL of the battery 41 on the basis of the third end of life EoL_t input from the EoL_t derivation unit 552 and the deterioration degree SoH input from the SoH calculator 553. The remaining lifetime SoL is a deterioration index (State of Life) obtained by normalizing the deterioration degree SoH by the third end of life EoL_t. The SoL calculator 554 performs the following arithmetic calculation of:

$$(SoH - EoL\_t) / (100 - EoL\_t) \times 100 \quad (3),$$

thereby calculating a remaining lifetime SoL and outputting the calculated remaining lifetime SoL.

Figure 4:
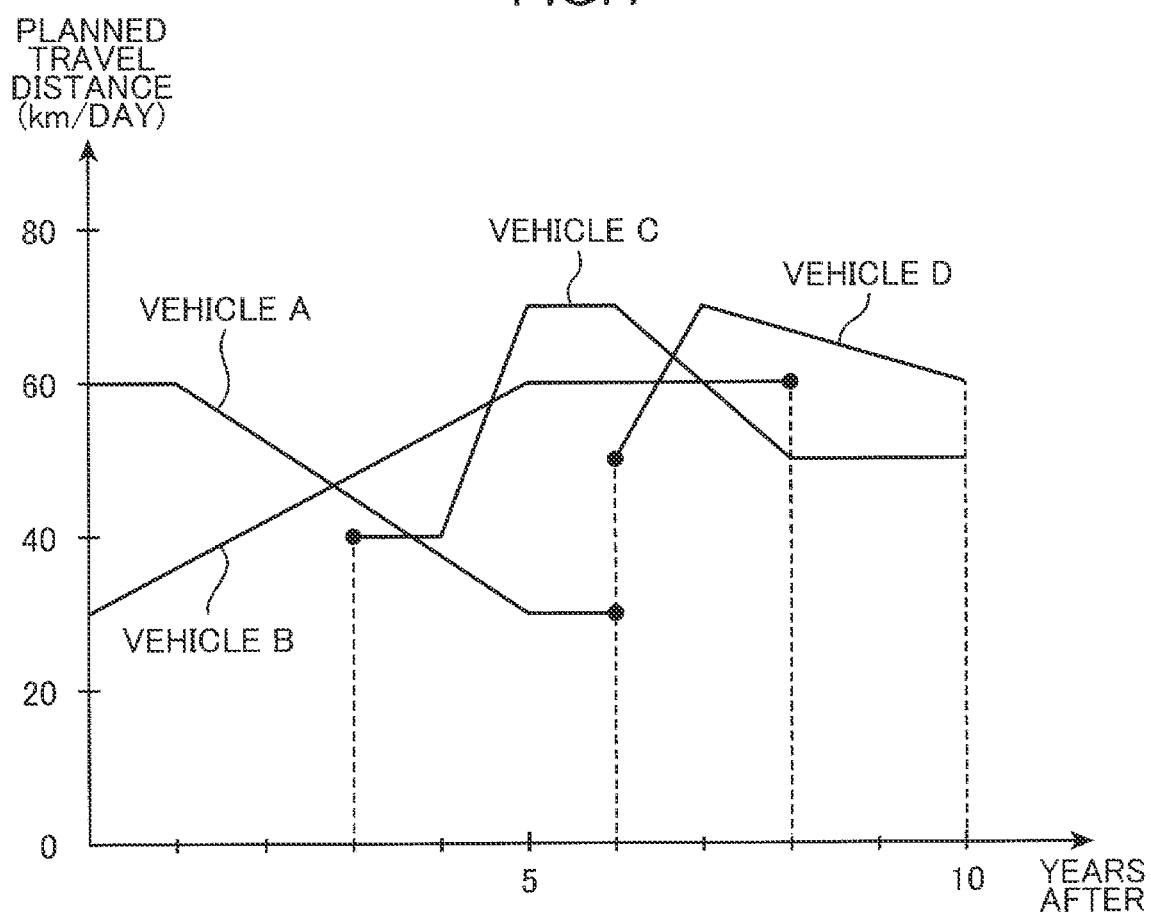
FIG. 4 is a diagram illustrating an example of a planned travel distance in a simplified manner.

FIG. 4 is a diagram illustrating, in a simplified manner, an example of travel plan information formulated by a certain business establishment. A planned travel distance (km/day) per day is set for each of a plurality of vehicles 13 (four vehicles A to D in this example) every year. The planned travel distance is an optimum value calculated by a predetermined prediction model on the basis of a long-term business plan of a target business establishment, deterioration characteristics of the battery 41 with respect to a total travel distance, cost information including a driver labor cost and a vehicle purchase cost, and the like. The prediction model can be derived by machine learning using artificial intelligence. As an algorithm of the prediction model, path optimization by linear programming, a neural network, multiple regression analysis, or the like can be used.

With reference to FIG. 4, it can be seen that the planned travel distance greatly increases or decreases every year even regarding the same vehicle 13 (e.g., the vehicle C). In addition, for example, the graph regarding the vehicle A disappears after six years. This indicates that timing for selling (or scrapping) the vehicle A is six years later. Further, a graph regarding, for example, the vehicle C appears after three years. This indicates that timing for purchasing the vehicle C is three years later.

The travel plan information illustrated in FIG. 4 is transmitted from the local PC12 to the cloud server 11 via the communication network 14 and stored in the storage unit 23. Note that the travel plan information may be prepared by the cloud server 11. The plan information acquisition unit 51 acquires the required capacity FCC_u of each vehicle 13 on the basis of the travel plan information read from the storage unit 23. Assuming that each vehicle 13 is charged every day at the business establishment, for example, the required capacity FCC_u of the vehicle A at present (after 0 year) is a capacity corresponding to 60 km travel. The plan information acquisition unit 51 inputs the required capacity FCC_u of each vehicle 13 acquired by converting the planned travel distance into the power consumption amount to the SoL calculation unit 55 as data D1.

Figure 5:
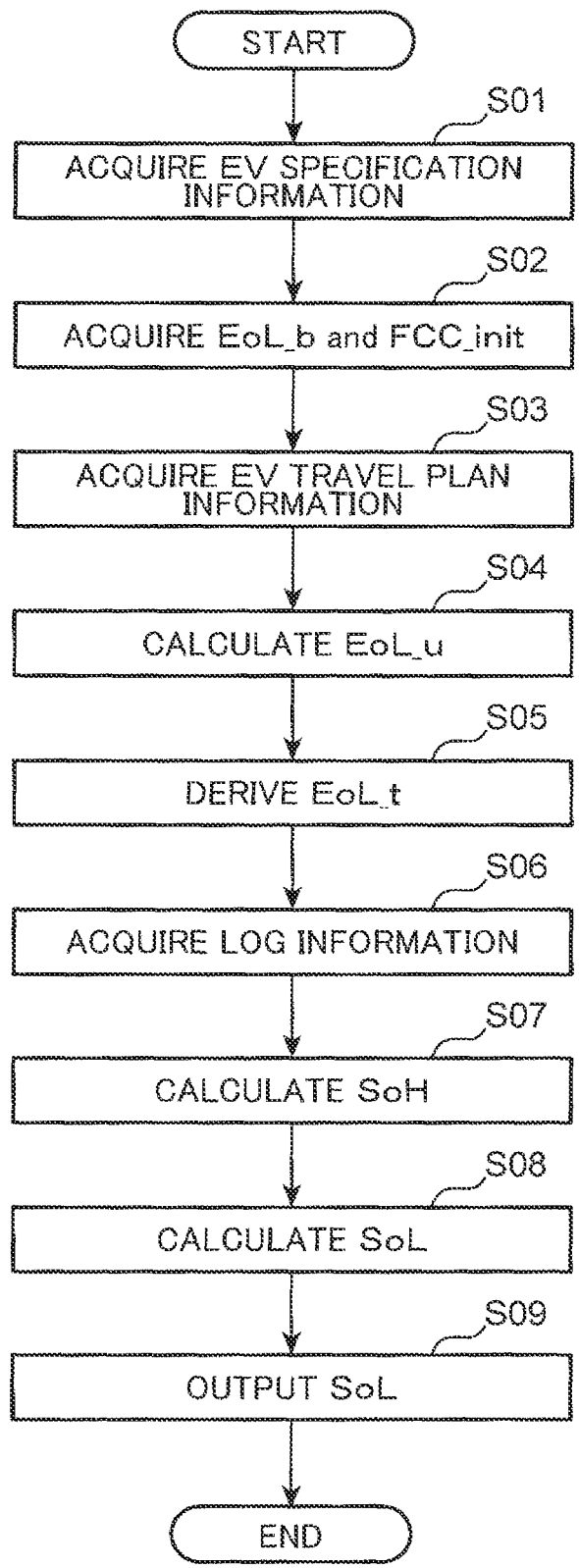
FIG. 5 is a flowchart illustrating a flow of processing executed by the data processing unit.

FIG. 5 is a flowchart illustrating a flow of processing executed by the data processing unit 22 of the cloud server 11 to calculate the remaining lifetime SoL of the EV.

When the cloud server 11 receives a request for calculating the remaining lifetime SoL of a certain vehicle 13 from the local PC12, first, in Step SOL the battery information acquisition unit 52 acquires EV specification information indicating specifications of the vehicle 13 from the local PC12 or from a database provided by a car manufacturer or the like. The specifications of the vehicle 13 include information indicating a type (model number or the like) of the battery 41 mounted on the vehicle 13.

Next, in Step S02, the battery information acquisition unit 52 accesses the battery information database 15 to acquire the second end of life EoL_b and the initial capacity FCC_init regarding the battery 41 of the type specified in Step S01 from the battery information database 15. The battery information acquisition unit 52 inputs the acquired second end of life EoL_b and the initial capacity FCC_init to the SoL calculation unit 55 as data D2.

Next, in Step S03, the plan information acquisition unit 51 acquires travel plan information on the target vehicle 13 by reading the travel plan information from the storage unit 23. In addition, the plan information acquisition unit 51 acquires the required capacity FCC_u regarding the target vehicle 13 on the basis of the travel plan information, and inputs the required capacity FCC_u to the SoL calculation unit 55 as the data D1. In a case where the travel plan information on the target vehicle 13 is not prepared, the plan information acquisition unit 51 may receive travel history information of the vehicle 13 from the vehicle 13 via the communication network 14, and estimate a future travel plan from a transition tendency of a past travel distance included in the travel history information.

Next, in Step S04, the EoL_u calculator 551 calculates the first end of life EoL_u of the battery 41 by performing the arithmetic calculation shown in the above Formula (1) on the basis of the initial capacity FCC_init input as the data D2 from the battery information acquisition unit 52 and the required capacity FCC_u input as the data D1 from the plan information acquisition unit 51.

Next, in Step S05, the EoL_t derivation unit 552 derives the third end of life EoL_t of the battery 41 by performing the arithmetic calculation shown in the above Formula (2) on the basis of the first end of life EoL_u input from the EoL_u calculator 551 and the second end of life EoL_b input as the data D2 from the battery information acquisition unit 52.

Next, in Step S06, the log information acquisition unit 53 acquires the log information from the target vehicle 13 via the communication network 14. The log information includes the travel history information of the vehicle 13 and charge/discharge history information of the battery 41. The log information acquisition unit 53 inputs the acquired log information to the SoL calculation unit 55 as data D3.

Next, in Step S07, the SoH calculator 553 calculates the deterioration degree SoH of the battery 41 on the basis of the charge/discharge history information of the battery 41 among the log information input from the log information acquisition unit 53.

Next, in Step S08, the SoL calculator 554 calculates the remaining lifetime SoL of the battery 41 by performing the arithmetic calculation shown in the above Formula (3) on the basis of the third end of life EoL_t input from the EoL_t derivation unit 552 and the deterioration degree SoH input from the SoH calculator 553.

Next, in Step S09, the SoL calculator 554 outputs the remaining lifetime SoL calculated in Step S08. The remaining lifetime SoL output from the SoL calculator 554 is transmitted to the local PC12 via the communication network 14, and information indicating the remaining lifetime of the target vehicle 13 is displayed on the display unit 31. Alternatively, the remaining lifetime SoL output from the SoL calculator 554 may be transmitted to the target vehicle 13 via the communication network 14, and the information indicating the remaining lifetime of the target vehicle 13 may be displayed on a display visually recognizable by the driver of the vehicle 13. As a mode of presenting the information indicating the remaining lifetime, sound output or the like may be used in addition to the above display. Further, the third end of life EoL_t may be presented instead of or in addition to the remaining lifetime SoL.

According to the present embodiment, the data processing unit 22 of the cloud server 11 (an information processing device) calculates the first end of life EoL_u on the basis of the required capacity FCC_u indicating a power consumption amount per use unit (per one charge) of the vehicle 13 and the initial capacity FCC_init of the battery 41. In addition, the data processing unit 22 acquires the second end of life EoL_b set according to the characteristics of the battery 41 such as safety. Then, the data processing unit 22 derives a shorter one of the first end of life EoL_u and the second end of life EoL_b as the end of life (the third end of life EoL_t) of the battery 41. Therefore, the end of life of the battery 41 can be derived according to the use mode of the vehicle 13 while ensuring safety. As a result, it is possible to achieve both reduction in a total cost and ensuring of safety.

Furthermore, according to the present embodiment, it is possible to appropriately manage an end of life of an EV as a movable body or the battery 41 mounted on the EV on the basis of travel information (the travel plan information or the travel history information) of the EV.

According to the present embodiment, it is possible to derive a remaining lifetime SoL of the battery 41 mounted on an EV according to a use mode of the EV while ensuring safety.

In addition, according to the present embodiment, the remaining lifetime SoL can be calculated from comparison in terms of the deterioration degree by calculating the remaining lifetime SoL on the basis of a difference between a deterioration degree corresponding to the third end of life EoL_t and the deterioration degree SoH.

According to the present embodiment, by causing a presentation device (the display unit 31 or the like) to present the third end of life EoL_t or the remaining lifetime SoL, it is possible to enable a user to grasp an end of life of the battery 41 for each use mode. In particular, in a case of presenting the remaining lifetime SoL, it is possible to provide a user with information that is easy for the user to intuitively understand.

Figure 6:
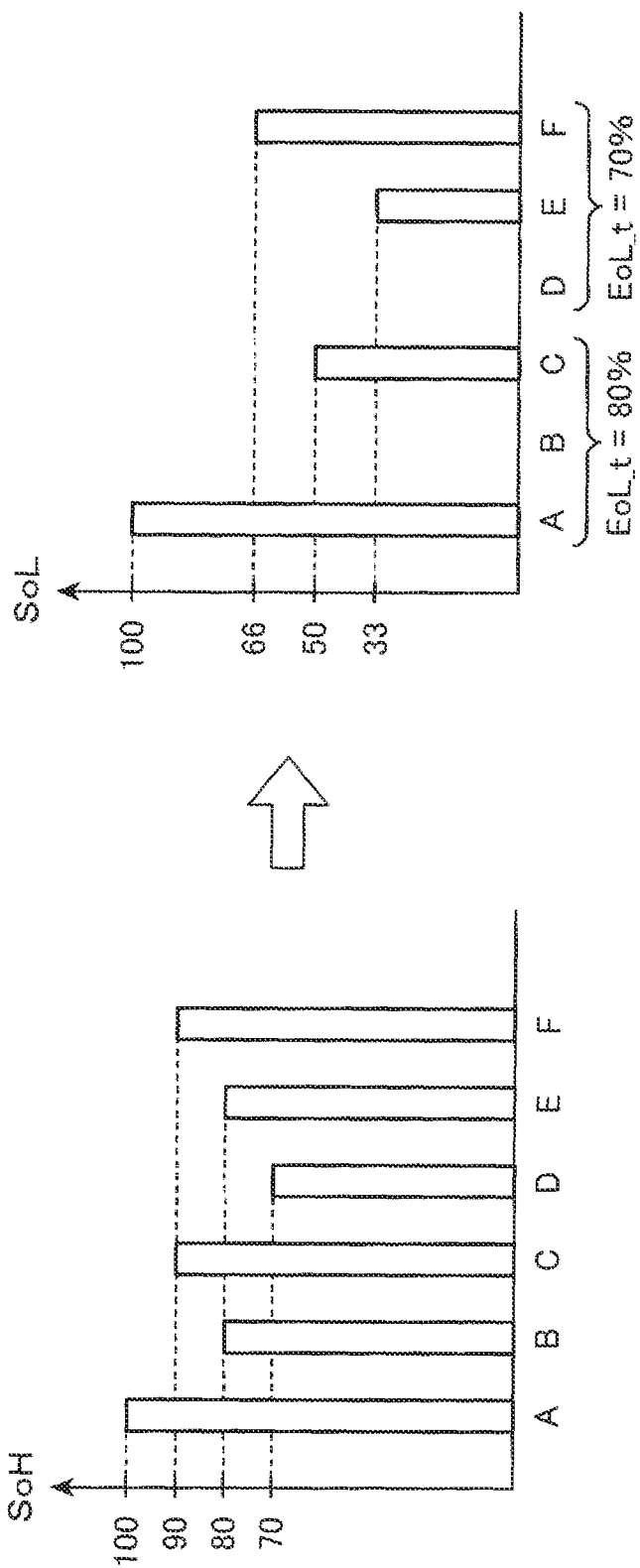
FIG. 6 is a diagram illustrating an example of a display mode of a remaining lifetime.

FIG. 6 is a diagram illustrating an example of a display mode of the remaining lifetime SoL. FIG. 6 shows results regarding six vehicles A to F. The graph on the left side of the figure illustrates a display mode using the deterioration degree SoH of the battery 41, and the graph on the right side of the figure illustrates a display mode using the remaining lifetime SoL obtained by normalizing the deterioration degree SoH in the left figure by the third end of life EoL_t. An example is illustrated in which the third end of life EoL_t of each of the vehicles A to C is 80% and the third end of life EoL_t of each of the vehicles D to F is 70%. For example, focusing on the vehicle F, since the current deterioration degree SoH is 90% and the third end of life EoL_t is 70%, the remaining lifetime SoL is (90−70)/(100−70)× 100=66%. According to the display mode (the right figure) of the remaining lifetime SoL, the user can intuitively understand that the vehicle 13 comes to the end of its life when a value on the vertical axis decreases to 0%.

According to the present embodiment, the data processing unit 22 acquires the travel plan information or the travel history information of the vehicle 13 as the travel information (the power consumption information). By using the travel plan information itself or by estimating future travel plan information from past travel history information, it is possible to appropriately acquire the travel information as the power consumption information.

Second Embodiment

Although in the first embodiment, the cloud server 11 calculates the remaining lifetime SoL of the battery 41 for the battery-driven EV, the present invention is not limited to this example. The cloud server 11 may calculate a remaining lifetime of a battery for any electric apparatus driven by the battery. The electric apparatus is, for example, an electric storage device. The electric storage device may have a power generating function. Use plan information of the electric apparatus can be formulated as power consumption information indicating the total power consumption amount of the battery. In a case where use plan information is unknown, the plan information acquisition unit 51 may estimate use plan information, on the basis of history information indicating past use conditions of the electric apparatus or the battery, from a tendency of the use conditions.

Figure 7:
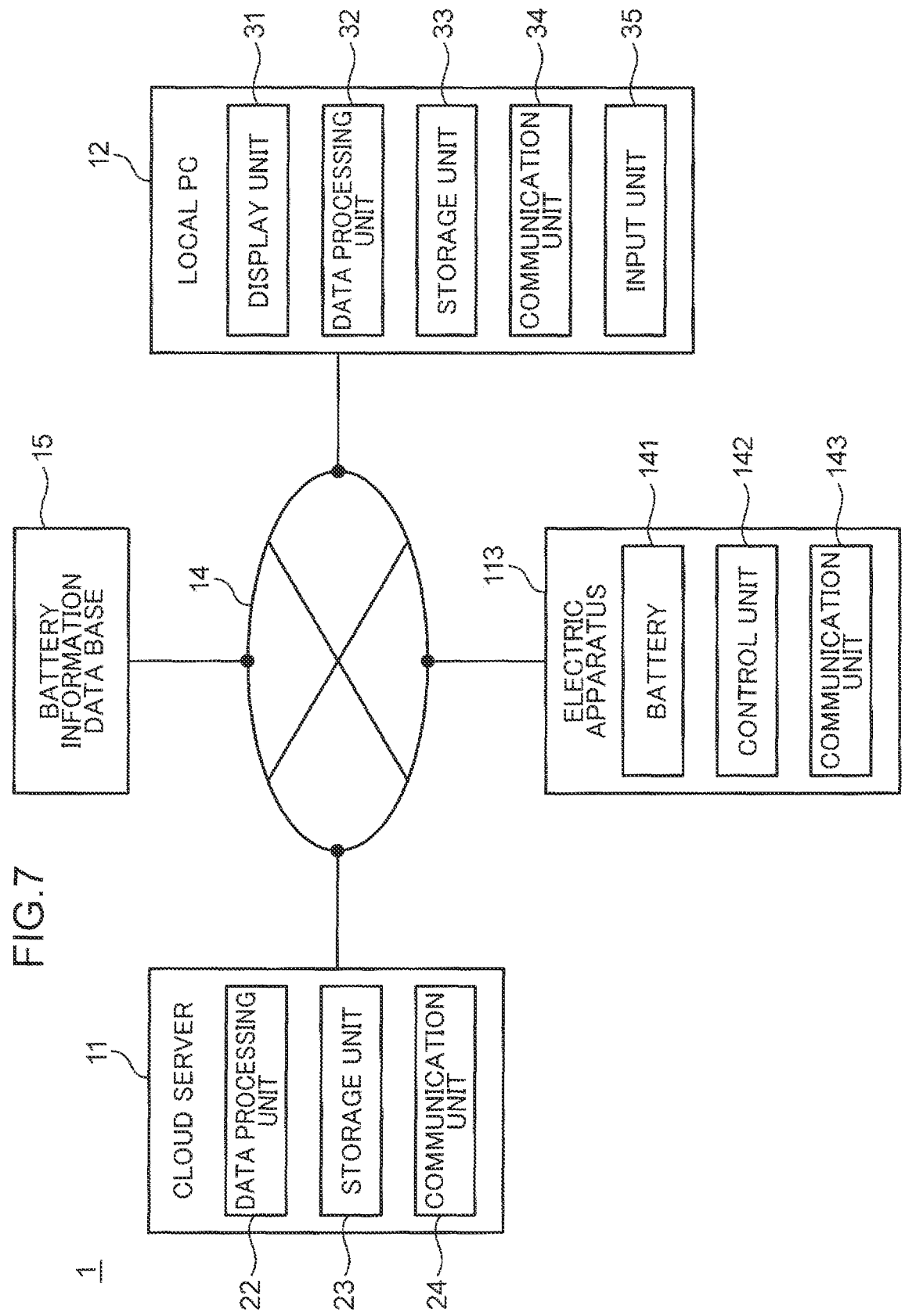
FIG. 7 is a block diagram illustrating a configuration of an information processing system according to a second embodiment of the present disclosure.

FIG. 7 is a block diagram illustrating a configuration of an information processing system 1 according to a second embodiment of the present disclosure. The vehicle 13 illustrated in FIG. 1 is replaced with an electric apparatus 113. The electric apparatus 113 includes a battery 141, a control unit 142, and a communication unit 143. The battery 141, the control unit 142, and the communication unit 143 correspond to the battery 41, the control unit 42, and the communication unit 43 illustrated in FIG. 1, respectively.

In the present embodiment, a cloud server 11 individually derives an end of life (a third end of life EoL_t or a remaining lifetime SoL) of the battery 141 according to a use mode of the electric apparatus 113 while considering characteristics of the battery 141 such as safety.

Figure 8:
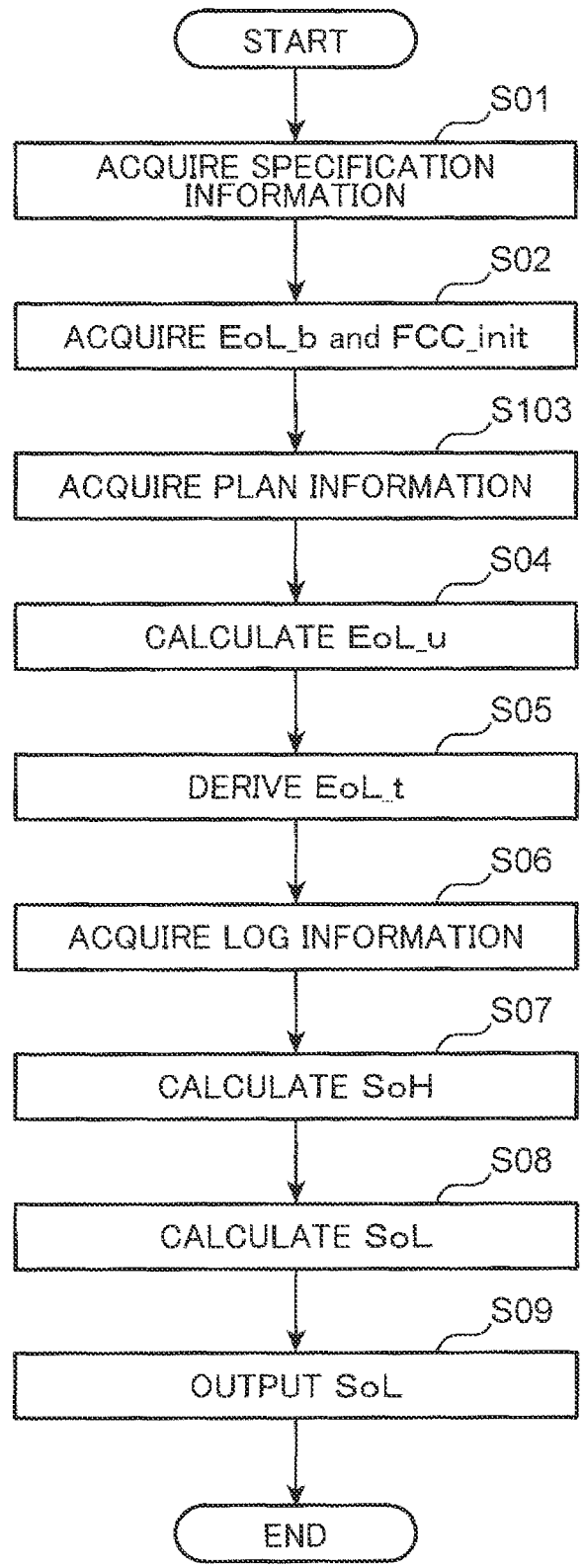
FIG. 8 is a flowchart illustrating a flow of processing executed by a data processing unit.

FIG. 8 is a flowchart illustrating a flow of processing executed by a data processing unit 22 of the cloud server 11 to calculate the remaining lifetime SoL of the electric apparatus 113.

When the cloud server 11 receives a request for calculating the remaining lifetime SoL of a certain electric apparatus 113 from a local PC12, first, in Step S01, a battery information acquisition unit 52 acquires specification information indicating specifications of the electric apparatus 113 from the local PC12 or from a database provided by an electric machinery manufacturer or the like. The specifications of the electric apparatus 113 include information indicating a type (model number or the like) of the battery 141 mounted on the electric apparatus 113.

Next, in Step S02, the battery information acquisition unit 52 accesses a battery information database 15 to acquire a second end of life EoL_b and an initial capacity FCC_init regarding the battery 141 of the type specified in Step S01 from the battery information database 15. The battery information acquisition unit 52 inputs the acquired second end of life EoL_b and the initial capacity FCC_init to the SoL calculation unit 55 as data D2.

Next, in Step S03, a plan information acquisition unit 51 reads the use plan information regarding the target electric apparatus 113 received from the local PC12 and stored in a storage unit 23 from the storage unit 23, thereby acquiring the use plan information. In addition, the plan information acquisition unit 51 acquires a required capacity FCC_u regarding the target electric apparatus 113 on the basis of the use plan information, and inputs the required capacity FCC_u to an SoL calculation unit 55 as data D1. In a case where the use plan information on the target electric apparatus 113 is not prepared, the plan information acquisition unit 51 may receive use history information of the electric apparatus 113 from the electric apparatus 113 via a communication network 14, and estimate a future use plan from a transition tendency of a past power consumption amount included in the use history information.

Next, in Step S04, an EoL_u calculator 551 calculates a first end of life EoL_u of the battery 141 by performing the arithmetic calculation shown in the above Formula (1) on the basis of the initial capacity FCC_init input as data D2 from the battery information acquisition unit 52 and the required capacity FCC_u input as the data D1 from the plan information acquisition unit 51.

Next, in Step S05, an EoL_t derivation unit 552 derives the third end of life EoL_t of the battery 141 by performing the arithmetic calculation shown in the above Formula (2) on the basis of the first end of life EoL_u input from the EoL_u calculator 551 and the second end of life EoL_b input as the data D2 from the battery information acquisition unit 52.

Next, in Step S06, a log information acquisition unit 53 acquires log information from the target electric apparatus 113 via the communication network 14. The log information includes the use history information of the electric apparatus 113 and charge/discharge history information of the battery 141. The log information acquisition unit 53 inputs the acquired log information to the SoL calculation unit 55 as data D3.

Next, in Step S07, an SoH calculator 553 calculates a deterioration degree SoH of the battery 141 on the basis of the charge/discharge history information of the battery 141 among the log information input from the log information acquisition unit 53.

Next, in Step S08, an SoL calculator 554 calculates the remaining lifetime SoL of the battery 141 by performing the arithmetic calculation shown in the above Formula (3) on the basis of the third end of life EoL_t input from the EoL_t derivation unit 552 and the deterioration degree SoH input from the SoH calculator 553.

Next, in Step S09, the SoL calculator 554 outputs the remaining lifetime SoL calculated in Step S08. The remaining lifetime SoL output from the SoL calculator 554 is transmitted to the local PC12 via the communication network 14, and information indicating the remaining lifetime of the target electric apparatus 113 is displayed on a display unit 31. Alternatively, the remaining lifetime SoL output from the SoL calculator 554 may be transmitted to the target electric apparatus 113 via the communication network 14, and the information indicating the remaining lifetime of the electric apparatus 113 may be displayed on a display visually recognizable by a user of the electric apparatus 113. As a mode of presenting the information indicating the remaining lifetime, sound output or the like may be used in addition to the above display.

According to the present embodiment, the data processing unit 22 of the cloud server 11 (an information processing device) calculates the first end of life EoL_u on the basis of the required capacity FCC_u indicating a power consumption amount per use unit (per one charge) of the electric apparatus 113 and the initial capacity FCC_init of the battery 141. In addition, the data processing unit 22 acquires the second end of life EoL_b set according to characteristics of the battery 141 such as safety. Then, the data processing unit 22 derives a shorter one of the first end of life EoL_u and the second end of life EoL_b as the end of life (the third end of life EoL_t) of the battery 141. Therefore, an end of life of the battery 141 can be derived according to a use mode of the electric apparatus 113 while ensuring safety. As a result, it is possible to achieve both reduction in a total cost and ensuring of safety.

INDUSTRIAL APPLICABILITY

The technique according to the present disclosure is particularly useful for a technique for deriving an end of life of a battery in an arbitrary electric apparatus such as an EV driven by the battery.

The invention claimed is:

1. An information processing method performed by an information processing device, the method comprising:
acquiring information indicating a use mode of an electric apparatus driven by a battery;
acquiring power consumption information indicating information corresponding to a power consumption amount per use unit of the electric apparatus;
acquiring initial capacity information indicating an initial capacity of the battery;
calculating a first reference value of the battery on the basis of the power consumption information and the initial capacity information;
acquiring a second reference value of the battery set according to characteristics of the battery; and
outputting a greater one of the first reference value and the second reference value as a third reference value of the battery, wherein
the initial capacity is a capacity of the battery when the battery is new and is provided from a manufacturer of the battery, an analysis manufacturer, or a manufacturer of the electric apparatus,
the first reference value is obtained according to the use mode of the electric apparatus, and
the second reference value is set by the manufacturer of the battery, the analysis manufacturer, or the manufacturer of the electric apparatus.

2. The information processing method according to claim 1, wherein
the electric apparatus is a movable body including a motor driven by the battery, and
the method, performed by the information processing device, comprises:
acquiring movement information of the movable body as the power consumption information, and
calculating the power consumption amount on the basis of moving distance information per the use unit of the movable body included in the movement information.

3. The information processing method, performed by the information processing device, according to claim 2, comprising:
acquiring deterioration information indicating a deterioration degree of the battery;
calculating a remaining lifetime of the battery on the basis of the third reference value and the deterioration degree; and
outputting the remaining lifetime.

4. The information processing method, performed by the information processing device, according to claim 3, comprising calculating the remaining lifetime on the basis of a difference between a deterioration degree corresponding to the third reference value and the deterioration degree indicated by the deterioration information.

5. The information processing method, performed by the information processing device, according to claim 3, comprising causing a presentation device to present the third reference value or the remaining lifetime.

6. The information processing method, performed by the information processing device, according to claim 2, comprising acquiring, movement history information or movement plan information of the movable body as the movement information.

7. An information processing system comprising at least one processor configured to perform operations comprising:
acquiring information indicating a use mode of an electric apparatus driven by a battery;
acquiring power consumption information indicating information corresponding to a power consumption amount per use unit of the electric apparatus driven by a battery;
acquiring initial capacity information indicating an initial capacity of the battery;
calculating a first reference value of the battery on the basis of the power consumption information and the initial capacity information;
acquiring a second reference value of the battery set according to characteristics of the battery; and
outputting a greater one of the first reference value and the second reference value as a third reference value of the battery, wherein the initial capacity is a capacity of the battery when the battery is new and is provided from a manufacturer of the battery, an analysis manufacturer, or a manufacturer of the electric apparatus, the first reference value is obtained according to the use mode of the electric apparatus, and the second reference value is set by the manufacturer of the battery, the analysis manufacturer, or the manufacturer of the electric apparatus.

* * * * *